US012771622B2

(12) United States Patent
Zhang

(10) Patent No.: US 12,771,622 B2
(45) Date of Patent: Oct. 20, 2026

(54) TRAFFIC ANALYSIS METHOD, CLOUD PLATFORM, AND RELATED APPARATUS

(71) Applicant: Huawei Cloud Computing Technologies Co., Ltd., Guizhou (CN)

(72) Inventor: Haohao Zhang, Dongguan (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 88 days.

(21) Appl. No.: 19/024,186

(22) Filed: Jan. 16, 2025

(65) Prior Publication Data

US 2025/0158903 A1 May 15, 2025

Related U.S. Application Data

(63) Continuation of application No. PCT/CN2023/085905, filed on Apr. 3, 2023.

(30) Foreign Application Priority Data

Jul. 27, 2022 (CN) ......................... 202210892122.0
Sep. 8, 2022 (CN) ......................... 202211098258.0

(51) Int. Cl.
*H04L 43/028* (2022.01)
*G06F 8/41* (2018.01)
*G06F 11/3604* (2025.01)

(52) U.S. Cl.
CPC .............. *H04L 43/028* (2013.01); *G06F 8/42* (2013.01); *G06F 8/44* (2013.01); *G06F 11/3604* (2013.01)

(58) Field of Classification Search
CPC ........................... H04L 43/028; G06F 11/3604
USPC .......................................................... 709/224
See application file for complete search history.

(56) References Cited

U.S. PATENT DOCUMENTS

2014/0258779 A1 9/2014 Kaler et al.
2014/0337429 A1 11/2014 Asenjo et al.
2017/0249130 A1* 8/2017 Smiljanic ................ G06F 16/22
2018/0276060 A1* 9/2018 Arumugam ........... G06F 9/5072
2019/0207976 A1 7/2019 Yadav et al.

FOREIGN PATENT DOCUMENTS

CN 112350882 A 2/2021
CN 114513566 A 5/2022

* cited by examiner

*Primary Examiner* — Lan Dai T Truong
(74) *Attorney, Agent, or Firm* — Conley Rose, P.C.

(57) ABSTRACT

A traffic analysis method is applied to a cloud platform that includes a management node and a plurality of traffic analysis engines. The management node obtains program code of a domain-specific language corresponding to a target traffic analysis task, and the management node verifies the program code. When the verification of the program code succeeds, the management node allocates the program code to a target engine. The target engine determines a traffic analysis result based on the program code. After the management node in the cloud platform obtains the program code corresponding to the target traffic analysis task, the traffic analysis engine may directly analyze traffic in the cloud platform.

20 Claims, 6 Drawing Sheets

TRAFFIC ANALYSIS METHOD, CLOUD PLATFORM, AND RELATED APPARATUS

CROSS-REFERENCE TO RELATED APPLICATIONS

This is a continuation of International Patent Application No. PCT/CN2023/085905 filed on Apr. 3, 2023, which claims priority to Chinese Patent Application No. 202210892122.0 filed on Jul. 27, 2022 and Chinese Patent Application No. 202211098258.0 filed on Sep. 8, 2022. All of the aforementioned patent applications are hereby incorporated by reference in their entireties.

TECHNICAL FIELD

This application relates to the field of network security technologies, and in particular, to a traffic analysis method, a cloud platform, and a related apparatus.

BACKGROUND

As a network scale increases, a network environment becomes complex. To ensure secure and stable running of a network, traffic analysis may need to be performed on traffic carried on the network, to obtain a traffic analysis result.

In a related technology, traffic analysis is performed using an intrusion detection system (IDS), to determine a traffic analysis result. For example, a detection rule library is established through machine learning, and matching is performed between to-be-analyzed traffic and each rule included in the detection rule library, to determine a corresponding traffic analysis result. Alternatively, to-be-analyzed traffic can be copied through packet capture, to obtain mirrored traffic, and then the mirrored traffic is sent to a traffic analysis device for traffic analysis.

However, when the traffic analysis is performed using the IDS, the detection rule library may need to be maintained, and updating and loading of the rule are complex. When the traffic analysis is performed through packet capture, the traffic may need to be copied first, and then the traffic analysis is performed based on the mirrored traffic obtained through copying. As a result, a delay of the traffic analysis is long.

SUMMARY

Embodiments of this application provide a traffic analysis method, a cloud platform, and a related apparatus, to improve timeliness of traffic analysis. Technical solutions are as follows.

According to a first aspect, a traffic analysis method is provided as applied to a cloud platform. The cloud platform includes a management node and a plurality of traffic analysis engines. The method includes a management node that obtains program code of a domain-specific language (DSL) corresponding to a target traffic analysis task, where the program code includes a location of a traffic analysis object, and the traffic analysis object is used to carry to-be-analyzed target traffic. The management node verifies the program code. When the verification of the program code succeeds, the management node allocates the program code to a target engine, where the target engine is a traffic analysis engine closest to the traffic analysis object in the plurality of traffic analysis engines. The target engine determines a traffic analysis result based on the program code.

The cloud platform includes the management node and the traffic analysis engines. The management node is configured to obtain the program code corresponding to the target traffic analysis task, and the traffic analysis engine is configured to perform traffic analysis based on the program code. In other words, in this application, after the management node in the cloud platform obtains the program code corresponding to the target traffic analysis task, the traffic analysis engine may directly analyze traffic in the cloud platform, and there is no need to first copy to-be-analyzed traffic based on a packet capture condition, and then send mirrored traffic to a traffic analysis device deployed outside the cloud platform for traffic analysis. Therefore, timeliness of traffic analysis can be improved.

In addition, all program code corresponding to the target traffic analysis task obtained by the management node is in a DSL language format. Therefore, an entire cloud computing environment is used as a unified language interface, such that different traffic analysis engines correspond to the unified language format. In other words, according to the method provided in this application, real-time and accurate traffic analysis can be performed in the cloud computing environment using the unified DSL language format.

In different cases, manners in which the management node obtains the program code of the DSL corresponding to the target traffic analysis task are different. The following separately provides descriptions using the following two cases.

In a first case, the management node receives the program code of the DSL corresponding to the target traffic analysis task, where the program code is submitted by a user terminal.

The user terminal submits the program code to the management node, where the program code is the program code of the DSL corresponding to the target traffic analysis task. After receiving the program code submitted by the user terminal, the management node determines the program code as the program code of the DSL corresponding to the target traffic analysis task.

When the user terminal detects a traffic analysis operation of a user, the user terminal displays a program editing interface, where the program editing interface includes a program code editing box. The user can enter the program code in the program code editing box. When detecting a confirmation operation of the user, the user terminal submits the program code to the management node. After receiving the program code submitted by the user terminal, the management node determines the program code as the program code of the DSL corresponding to the target traffic analysis task.

In a second case, a user terminal displays a program purchase interface, where the program purchase interface includes description information of a plurality of traffic analysis tasks. The management node receives a program purchase request submitted by the user terminal, where the program purchase request carries an identifier of the target traffic analysis task. The management node obtains, based on the identifier of the target traffic analysis task, the program code of the DSL corresponding to the target traffic analysis task from stored program code of DSLs corresponding to the plurality of traffic analysis tasks.

In other words, the cloud platform provides a program purchase function. The user can view a traffic analysis object, a type of each traffic analysis task, and a traffic analysis result that correspond to each of the plurality of traffic analysis tasks provided by the cloud platform, and then select a target traffic analysis task whose traffic analysis result matches a traffic analysis result expected by the user. Then, the management node directly obtains, based on the identifier of the target traffic analysis task, the program code of the DSL corresponding to the target traffic analysis task. In this way, the user can directly purchase the program code from the cloud platform, and may not need to perform program code editing. This helps reduce costs and time spent by the user in the program code editing.

After obtaining the program code of the DSL corresponding to the target traffic analysis task, the management node performs syntax analysis on the program code, to obtain a syntax analysis result. When the syntax analysis result indicates that the program code has no syntax error, the management node performs semantic analysis on the program code, to obtain a semantic analysis result. When the semantic analysis result indicates that the program code has no semantic error, the management node determines that the verification of the program code succeeds.

After obtaining the program code, the management node first verifies the program code, and when the verification of the program code succeeds, the traffic analysis engine performs traffic analysis, such that accuracy of the traffic analysis can be further improved.

The target engine performs just-in-time compilation on the program code, to obtain executable code corresponding to the program code. The target engine runs the executable code, to obtain the traffic analysis result.

The target engine determines, based on the program code, a plurality of operators used to execute the target traffic analysis task, orchestrates a sequence of the plurality of operators, to obtain an operator orchestration result, and determines the operator orchestration result as the executable code corresponding to the program code.

In other words, the entire cloud computing environment is used as a unified language interface, and all the program code obtained by the management node at an upper layer is in the DSL language format. Through just-in-time compilation, each traffic analysis engine at a lower layer dynamically converts the unified DSL language format into a language format that can be run by the traffic analysis engine. In this way, processor differences between the traffic analysis engines at the lower layer are shielded, and the unified DSL language format is used for traffic analysis in the cloud computing environment.

The target engine performs traffic analysis on the target traffic by running the plurality of operators based on the operator orchestration result, to obtain the traffic analysis result.

Optionally, the program code includes a result filter condition. In this way, after the target engine determines the traffic analysis result based on the program code, the target engine can further filter the traffic analysis result based on the result filter condition included in the program code, and send a filtered traffic analysis result to the management node. After receiving the filtered traffic analysis result sent by the target engine, the management node sends the filtered traffic analysis result to the user terminal. The user terminal receives and displays the filtered traffic analysis result sent by the management node.

According to a second aspect, a cloud platform is provided. The cloud platform includes a management node and a plurality of traffic analysis engines, the management node is configured to implement the traffic analysis method in the first aspect, and the plurality of traffic analysis engines is configured to implement the traffic analysis method in the first aspect.

According to a third aspect, a computing device cluster is provided. The computing device cluster includes at least one computing device, each computing device includes a processor and a memory, and a processor of the at least one computing device is configured to execute instructions stored in a memory of the at least one computing device, such that the computing device cluster performs the traffic analysis method provided in the first aspect.

Optionally, each computing device may further include a communication bus, and the communication bus is configured to establish a connection between the processor and the memory of each computing device.

According to a fourth aspect, a computer-readable storage medium is provided. The storage medium stores instructions, and when the instructions are run in a computing device cluster, the computing device cluster is enabled to perform steps of the traffic analysis method in the first aspect.

According to a fifth aspect, a computer program product including instructions is provided. When the instructions are run in a computing device cluster, the computing device cluster is enabled to perform steps of the traffic analysis method in the first aspect.

Technical effects achieved in the second aspect, the third aspect, the fourth aspect, and the fifth aspect are similar to those achieved by corresponding technical means in the first aspect. Details are not described herein again.

DESCRIPTION OF EMBODIMENTS

To make objectives, technical solutions, and advantages of this application clearer, the following further describes implementations of this application in detail with reference to the accompanying drawings.

Before a traffic analysis method provided in embodiments of this application is described in detail, terms, a service scenario, and a system architecture in embodiments of this application are first described.

For ease of understanding, the terms in embodiments of this application are first described.

A DSL is a computer language that focuses on a program domain. Compared with a common general-purpose language (GPL) that is applicable to a plurality of program domains, the DSL is applicable only to some specific program domains.

Just-in-time compilation (JIT compiler) means converting program code or bytecode into machine code, converting the program code or the bytecode into corresponding executable code, such that an engine can run the executable code. The just-in-time compilation may also be referred to as dynamic translation or runtime compilation.

The executable code obtained through just-in-time compilation is stored in a memory of the engine. When the program code or the bytecode is invoked again, the engine can directly run the stored executable code, and does not need to convert the program code or the bytecode into the machine code, such that performance of the engine can be improved.

Then, the service scenario and the system architecture in embodiments of this application are described.

The traffic analysis method provided in embodiments of this application can be applied to a plurality of scenarios, for example, abnormal traffic detection, advanced persistent threat (APT) attack detection, a scanning attack, a carpet-bombing attack, account cracking, analysis of malicious traffic such as a botnet, a Trojan horse, and a worm, traffic compliance analysis, application traffic identification, network asset collection, proactive high-risk asset discovery, proactive vulnerability discovery, and traffic defense and cleaning.

Figure 1:
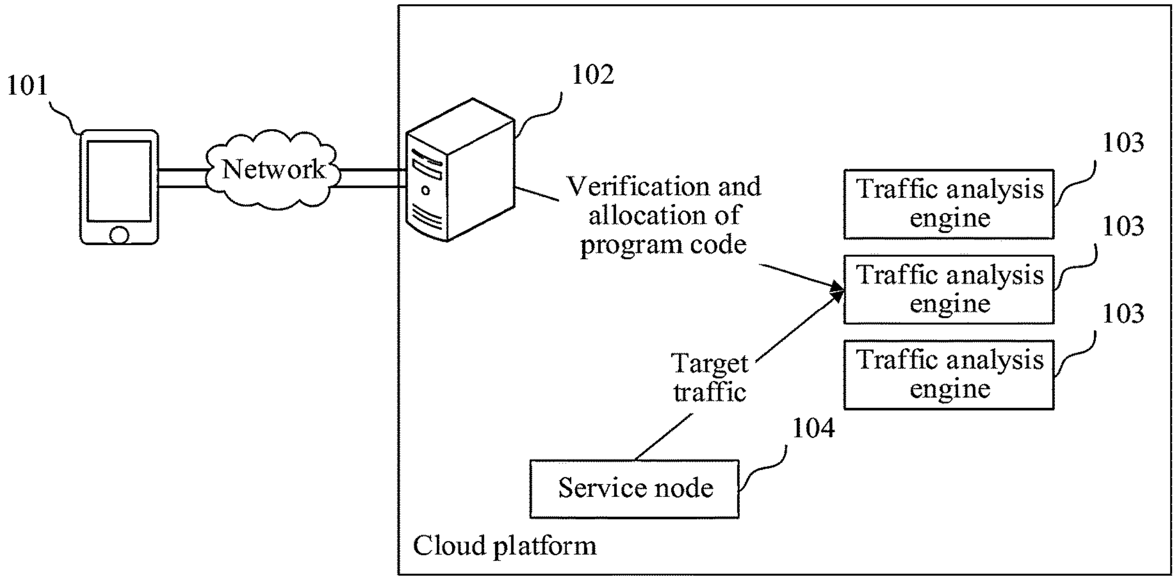
FIG. 1 is a diagram of a system architecture according to an embodiment of this application.

FIG. 1 is a diagram of an architecture of a traffic analysis system according to an embodiment of this application. The system includes a user terminal 101, a management node 102, and a plurality of traffic analysis engines 103 (three traffic analysis engines are used as an example for description in FIG. 1). The management node 102 and the plurality of traffic analysis engines 103 form a cloud platform.

Optionally, the system further includes a plurality of service nodes 104 (one service node is used as an example for description in FIG. 1). The management node 102, the plurality of traffic analysis engines 103, and the plurality of service nodes 104 form a cloud platform.

The user terminal 101 is communicatively connected to the management node 102. The communication connection may be a wired connection or a wireless connection. This is not limited in this embodiment of this application.

The user terminal 101 submits program code of a DSL corresponding to a target traffic analysis task to the management node 102, where the program code includes a location of a traffic analysis object, such that the management node 102 can obtain the program code of the DSL corresponding to the target traffic analysis task. Alternatively, the user terminal 101 submits a program purchase request to the management node 102, where the program purchase request carries an identifier of a target traffic analysis task. The management node 102 obtains, based on the identifier of the target traffic analysis task, program code of a DSL corresponding to the target traffic analysis task from program code of DSLs corresponding to a plurality of traffic analysis tasks.

The traffic analysis object is a service node configured to carry to-be-analyzed target traffic in the plurality of service nodes 104.

After obtaining the program code of the DSL corresponding to the target traffic analysis task, the management node 102 verifies the program code. When the verification of the program code succeeds, the management node 102 allocates the program code to a target engine 103 closest to the traffic analysis object. After receiving the program code allocated by the management node 102, the target engine 103 performs just-in-time compilation on the program code to obtain executable code corresponding to the program code, obtains the target traffic carried by the service node 104, and further analyzes the target traffic based on the executable code to obtain a traffic analysis result. Then, the target engine 103 sends the traffic analysis result to the management node 102. After receiving the traffic analysis result sent by the target engine 103, the management node 102 sends the traffic analysis result to the user terminal 101. The user terminal 101 receives and displays the traffic analysis result sent by the management node 102.

The user terminal 101 may be any electronic product that can perform human-computer interaction with a user, for example, through voice interaction or using a keyboard, a touchpad, a touchscreen, a remote control, or a handwriting device. For example, the user terminal 101 may be a personal computer (PC), a mobile phone, a smartphone, a personal digital assistant (PDA), a palmtop computer, a tablet computer, or the like.

The cloud platform may be a server cluster or a distributed system including a plurality of physical servers, may be a cloud server that provides basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform, or may be a cloud computing service center.

A person skilled in the art should understand that the user terminal 101 and the cloud platform are merely examples. Another existing or future user terminal and cloud platform applicable to embodiments of this application should also fall within the protection scope of embodiments of this application, and are included herein by reference.

It should be noted that the service scenario and the system architecture described in embodiments of this application are intended to describe the technical solutions in embodiments of this application more clearly, and do not constitute a limitation on the technical solutions provided in embodiments of this application. A person of ordinary skill in the art may learn that the technical solutions provided in embodiments of this application are also applicable to a similar technical problem as the system architecture evolves and a new service scenario emerges.

The following describes in detail the traffic analysis method provided in embodiments of this application.

Figure 2:
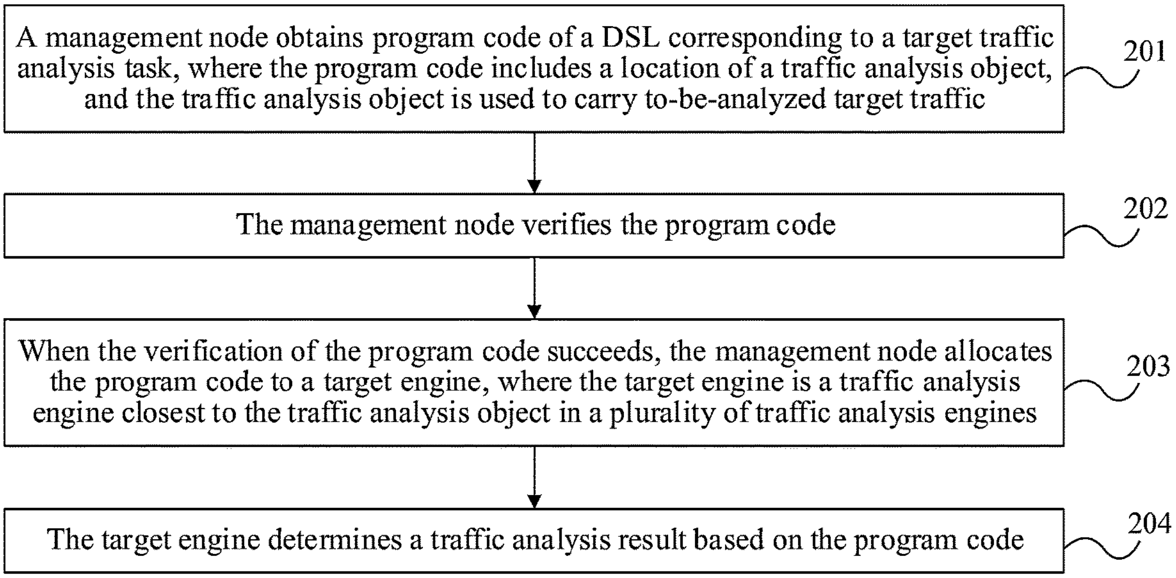
FIG. 2 is a flowchart of a traffic analysis method according to an embodiment of this application.

FIG. 2 is a flowchart of a traffic analysis method according to an embodiment of this application. The method is applied to a cloud platform, and the cloud platform includes a management node and a plurality of traffic analysis engines. Refer to FIG. 2. The method includes the following steps.

Step 201: The management node obtains program code of a DSL corresponding to a target traffic analysis task, where the program code includes a location of a traffic analysis object, and the traffic analysis object is used to carry to-be-analyzed target traffic.

Optionally, the cloud platform further includes a plurality of service nodes, and the traffic analysis object is a service node configured to carry the to-be-analyzed target traffic in the plurality of service nodes.

In different cases, manners in which the management node obtains the program code of the DSL corresponding to the target traffic analysis task are different. The following separately provides descriptions using the following two cases.

In a first case, the management node receives the program code of the DSL corresponding to the target traffic analysis task, where the program code is submitted by a user terminal.

The user terminal submits the program code to the management node, where the program code is the program code of the DSL corresponding to the target traffic analysis task. After receiving the program code submitted by the user terminal, the management node determines the program code as the program code of the DSL corresponding to the target traffic analysis task.

When the user terminal detects a traffic analysis operation of a user, the user terminal displays a program editing interface, where the program editing interface includes a program code editing box. The user can enter the program code in the program code editing box. When detecting a confirmation operation of the user, the user terminal submits the program code to the management node. After receiving the program code submitted by the user terminal, the management node determines the program code as the program code of the DSL corresponding to the target traffic analysis task.

The traffic analysis operation of the user may be triggered through voice interaction, or may be triggered using a click operation on a traffic analysis button. The confirmation operation of the user may be triggered through voice interaction, or may be triggered using a click operation on a submit button in the program editing interface.

It should be noted that, that the user terminal submits the program code to the management node mentioned above is merely an example. In some other embodiments, the user terminal displays a program editing interface, where the program editing interface includes a program code editing box. A user can enter a user-defined expression in the program code editing box, where the user-defined expression includes the traffic analysis object and a type of a traffic analysis task. When detecting a confirmation operation of the user, the user terminal submits the user-defined expression to the management node. After receiving the user-defined expression submitted by the user terminal, the management node converts, based on a related algorithm, the user-defined expression into the program code of the DSL corresponding to the target traffic analysis task.

In a second case, a user terminal displays a program purchase interface, where the program purchase interface includes description information of a plurality of traffic analysis tasks. The management node receives a program purchase request submitted by the user terminal, where the program purchase request carries an identifier of the target traffic analysis task, and the target traffic analysis task is one of the plurality of traffic analysis tasks. The management node obtains, based on the identifier of the target traffic analysis task, the program code of the DSL corresponding to the target traffic analysis task from program code of DSLs corresponding to the plurality of traffic analysis tasks.

When detecting a program purchase operation of a user, the user terminal sends a traffic analysis task query request to the management node. After receiving the traffic analysis task query request sent by the user terminal, the management node sends the stored description information of the plurality of traffic analysis tasks to the user terminal. After receiving the description information of the plurality of traffic analysis tasks sent by the management node, the user terminal displays the program purchase interface, where the program purchase interface includes the description information of the plurality of traffic analysis tasks. The user can select description information of the target traffic analysis task from the description information of the plurality of traffic analysis tasks. When detecting a confirmation operation of the user, the user terminal sends the program purchase request to the management node, where the program purchase request carries the identifier of the target traffic analysis task.

The management node stores a correspondence between an identifier of a traffic analysis task and program code. Therefore, after receiving the program purchase request submitted by the user terminal, the management node can obtain, based on the identifier of the target traffic analysis task carried in the program purchase request and the correspondence between an identifier of a traffic analysis task and program code, the program code of the DSL corresponding to the target traffic analysis task.

Description information of a traffic analysis task includes a traffic analysis object, a type of the traffic analysis task, and a traffic analysis result. Certainly, during actual application, the description information of the traffic analysis task may further include other information. This is not limited in this embodiment of this application.

An identifier of a traffic analysis task is used to uniquely identify the traffic analysis task. The identifier of the traffic analysis task is a traffic analysis object of the traffic analysis task, a type of the traffic analysis task, a number of the traffic analysis task, or the like, or is obtained by combining the information.

In other words, the cloud platform provides a program purchase function. The user can view a traffic analysis object, a type of each traffic analysis task, and a traffic analysis result that correspond to each of the plurality of traffic analysis tasks provided by the cloud platform, and then select a target traffic analysis task whose traffic analysis result matches a traffic analysis result expected by the user. Then, the management node directly obtains, based on the identifier of the target traffic analysis task, the program code of the DSL corresponding to the target traffic analysis task. In this way, the user can directly purchase the program code from the cloud platform, and may not need to perform program code editing. This helps reduce costs and time spent by the user in the program code editing.

For example, the program code corresponding to the target traffic analysis task obtained by the management node is: {select top 10 srcip from dstip=1.1.1.1/29 every minute to dest report}, this means, the program code means obtaining a list of top 10 source addresses that are used to access a destination address 1.1.1.1/29 every minute. For another example, the program code corresponding to the target traffic analysis task obtained by the management node is: {get application traffic from srcip=2.2.2.2 every second with application lib xxx def lib{port=80 append service type: web}}, this means, the program code means determining a protocol type corresponding to an application program whose source address is 2.2.2.2 every second.

Step 202: The management node verifies the program code.

After obtaining the program code of the DSL corresponding to the target traffic analysis task, the management node performs syntax analysis on the program code, to obtain a syntax analysis result, where the syntax analysis result indicates whether the program code has a syntax error. When the syntax analysis result indicates that the program code has no syntax error, the management node performs semantic analysis on the program code, to obtain a semantic analysis result, where the semantic analysis result indicates whether the program code has a semantic error. When the semantic analysis result indicates that the program code has no semantic error, the management node determines that the verification of the program code succeeds.

An implementation process in which the management node performs syntax analysis on the program code includes: The management node compares a language format of the program code with a reference language format. If the language format of the program code matches the reference language format, the management node determines that the program code has no syntax error. If the language format of the program code does not match the reference language format, the management node determines that the program code has a syntax error.

The reference language format is preset. In addition, the reference language format can further be adjusted based on different requirements.

When the syntax analysis result indicates that the program code has a syntax error, the management node sends the syntax analysis result to the user terminal. The user terminal receives and displays the syntax analysis result sent by the management node, such that the user performs syntax correction on the program code based on the syntax analysis result, to obtain syntactically corrected program code. Alternatively, the management node directly performs syntax correction on the program code, to obtain syntactically corrected program code. In other words, when the management node determines that the program code has a syntax error, the user terminal performs syntax correction on the program code, or the management node directly performs syntax correction on the program code.

That the program code has a syntax error means that the program code has at least one of a spelling error, a punctuation error, an abnormal line feed, and the like.

When the syntax analysis result indicates that the program code has no syntax error, the management node performs semantic analysis on the program code, to determine whether the program code has a semantic error. For example, the management node precompiles the program code based on a related algorithm to obtain a precompilation result corresponding to the program code, and then runs the precompilation result to obtain a pre-running result. Then, the management node determines the semantic analysis result based on the pre-running result.

Optionally, when the pre-running result is any one of a running exception, a running timeout, a forcible termination, or the like, it is determined that the program code has a semantic error. Otherwise, it is determined that the program code has no semantic error.

When the semantic analysis result indicates that the program code has a semantic error, the management node determines that the verification of the program code fails. In this case, the management node directly performs semantic correction on the program code, to obtain semantically corrected program code. When the semantic analysis result indicates that the program code has no semantic error, the management node determines that the verification of the program code succeeds.

Optionally, when the management node determines that the program code has no semantic error, the management node can further optimize the program code, to obtain optimized program code. For example, the management node performs code optimization on the program code whose verification succeeds. When ensuring that the target traffic analysis task indicated by the program code remains unchanged, the management node performs code optimization on the program code using different coding methods, to avoid redundant calculation. Alternatively, the management node performs algorithm optimization on the program code whose verification succeeds. When ensuring that the target traffic analysis task indicated by the program code remains unchanged, the management node performs algorithm optimization on the program code using different algorithms, to reduce calculation complexity.

Step 203: When the verification of the program code succeeds, the management node allocates the program code to a target engine, where the target engine is a traffic analysis engine closest to the traffic analysis object in the plurality of traffic analysis engines.

Based on the foregoing descriptions, the program code includes the location of the traffic analysis object. Therefore, when the management node determines that the verification of the program code succeeds, the management node can extract the location of the traffic analysis object from the program code. Then, the management node selects the traffic analysis engine closest to the traffic analysis object from the plurality of traffic analysis engines based on the location of the traffic analysis object and a location of each of the plurality of traffic analysis engines, determines the selected traffic analysis engine as the target engine, and then allocates the program code to the target engine.

In other words, the management node determines a distance between the traffic analysis object and each of the plurality of traffic analysis engines based on a related algorithm, to obtain a plurality of distances, then determines a traffic analysis engine corresponding to a smallest distance in the plurality of distances as the target engine, and allocates the program code to the target engine.

The management node determines the traffic analysis engine closest to the traffic analysis object in the plurality of traffic analysis engines as the target engine, and allocates the program code to the target engine. This helps the target engine subsequently obtain, more quickly, the target traffic carried by the traffic analysis object. Therefore, efficiency of performing traffic analysis on the target traffic by the target engine is improved.

Optionally, in addition to the location of the traffic analysis object, the management node can further extract other information from the program code, for example, whether to associate another traffic analysis object in a same domain for intra-domain traffic analysis, and whether to associate another traffic analysis object in a different domain for inter-domain traffic analysis.

Step 204: The target engine determines a traffic analysis result based on the program code.

The target engine performs just-in-time compilation on the program code, to obtain executable code corresponding to the program code. The target engine runs the executable code, to obtain the traffic analysis result.

In some embodiments, after receiving the program code allocated by the management node, the target engine performs just-in-time compilation on the program code according to the following steps (11) to (13), to obtain the executable code corresponding to the program code.

(11) The target engine determines, based on the program code, a plurality of operators used to execute the target traffic analysis task.

The target engine parses the program code, to obtain a type of the target traffic analysis task. The target engine selects, from operators included in the target engine based on the type of the target traffic analysis task, the plurality of operators used to execute the target traffic analysis task.

The target engine parses the program code based on a related algorithm, to obtain key information of the program code in different dimensions, and further combines the key information of the program code in the different dimensions, to obtain the type of the target traffic analysis task.

Optionally, the target engine includes a multi-layer parsing model, and the target engine can parse the program code using the multi-layer parsing model, to obtain the type of the target traffic analysis task. In the multi-layer parsing model, each layer corresponds to a different protocol type. The program code is parsed using different protocol types, such that the key information of the program code in the different dimensions can be obtained. In the multi-layer parsing model, an input of a first layer is the program code, and inputs of remaining layers are all outputs of previous layers. In other words, the remaining layers further parse the outputs of the previous layers. In this way, the key information that is of the program code in the different dimensions and that is output by other layers is combined in an output of a last layer in the multi-layer parsing model, to obtain the type of the target traffic analysis task.

The target engine includes a plurality of different operators, and the different operators are used to perform traffic analysis on the target traffic in different manners. The target engine selects, from the operators included in the target engine based on the type of the target traffic analysis task, the plurality of operators used to execute the target traffic analysis task.

For example, the target engine includes a differentiation operator, a gradient operator, a dispersion operator, a sort operator, a statistical operator, an average value operator, a maximum value operator, and the like.

It is assumed that the target engine determines that the type of the target traffic analysis task is obtaining a list of top 10 computer devices that access the traffic analysis object within one minute. In this case, the operators that are used to execute the target traffic analysis task and that are selected by the target engine are the statistical operator and the sort operator.

Optionally, because the target engine is determined based on the location of the traffic analysis object, and the type of the target traffic analysis task is not considered, the operator used to execute the target traffic analysis task may not exist in the operators included in the target engine. To ensure that the target engine can perform traffic analysis on the target traffic to obtain the traffic analysis result, the program code further includes the plurality of operators used to execute the target traffic analysis task. In other words, when submitting the program code to the management node, the user terminal adds, to the program code, the plurality of operators used to execute the target traffic analysis task. In this way, after receiving the program code allocated by the management node, the target engine can directly extract, from the program code, the plurality of operators used to execute the target traffic analysis task, to improve efficiency of performing traffic analysis on the target traffic by the target engine.

(12) The target engine orchestrates a sequence of the plurality of operators, to obtain an operator orchestration result.

After selecting the plurality of operators used to execute the target traffic analysis task, the target engine orchestrates the sequence of the plurality of operators based on the type of the target traffic analysis task, to obtain the operator orchestration result.

A language format of the operator orchestration result is related to a hardware architecture of the target engine.

Because processors corresponding to all of the plurality of traffic analysis engines are different, language formats that can be run by the traffic analysis engines are also different. However, all program code corresponding to the target traffic analysis task obtained by the management node is in a DSL language format. To ensure that the target engine can perform traffic analysis on the target traffic, after receiving the program code in the DSL language format allocated by the management node, the target engine first selects, according to the foregoing steps (11) and (12), the plurality of operators used to execute the target traffic analysis task, and then orchestrates the sequence of the plurality of operators based on a language format that can be run by the target engine.

In other words, an entire cloud computing environment is used as a unified language interface, and all the program code obtained by the management node at an upper layer is in the DSL language format. Through just-in-time compilation, each traffic analysis engine at a lower layer dynamically converts the unified DSL language format into a language format that can be run by the traffic analysis engine. In this way, processor differences between the traffic analysis engines at the lower layer are shielded, and the unified DSL language format is used for traffic analysis in the cloud computing environment.

For example, the processor corresponding to the traffic analysis engine is any one of an X86 processor, an advanced reduced instruction set computing machine (advanced RISC machine (ARM)) processor, a network process (NP) processor, and an application-specific integrated circuit (ASIC) processor.

It is assumed that a processor corresponding to the target engine is the ARM processor. The type of the target traffic analysis task is obtaining the list of top 10 computer devices that access the traffic analysis object within one minute, and the operators that are used to execute the target traffic analysis task and that are selected by the target engine are the statistical operator and the sort operator. When executing the target traffic analysis task, the target engine may need to first collect statistics on traffic consumed by each computer device for accessing the traffic analysis object within one minute, and then sort the traffic consumed by each computer device. In addition, the language format that can be run by the target engine is an ARM language format. Therefore, the operator orchestration result determined by the target engine is: [statistical operator in the ARM language format; sort operator in the ARM language format].

(13) The target engine determines the operator orchestration result as the executable code corresponding to the program code.

After determining the operator orchestration result according to the foregoing steps, the target engine determines the operator orchestration result as the executable code corresponding to the program code.

In some embodiments, the target engine runs the executable code according to the following steps (21) and (22), to obtain the traffic analysis result.

(21) The target engine obtains the target traffic carried by the traffic analysis object.

Based on the foregoing descriptions, the program code includes the location of the traffic analysis object. Therefore, after receiving the program code allocated by the management node, the target engine can directly determine, from the plurality of service nodes based on the location of the traffic analysis object included in the program code, the service node that carries the target traffic, and further obtain, in a manner such as optical splitting, mirroring, or mapping, the target traffic carried by the traffic analysis object.

(22) The target engine performs traffic analysis on the target traffic by running the plurality of operators based on the operator orchestration result, to obtain the traffic analysis result.

The target traffic carried by the traffic analysis object includes different types of traffic flowing into the traffic analysis object when each computer device accesses the traffic analysis object, and also includes different types of traffic flowing out of the traffic analysis object when the traffic analysis object responds to each computer device. Therefore, after obtaining the target traffic carried by the traffic analysis object, the target engine may need to first filter the target traffic based on the target traffic analysis task, to obtain traffic used to execute the target traffic analysis task. In other words, the target engine determines, based on the target traffic analysis task, a reference source address and a reference destination address of the traffic used to execute the target traffic analysis task, and then selects, from the target traffic, traffic whose source address is the same as the reference source address and whose destination address is also the same as the reference destination address, to obtain the traffic used to execute the target traffic analysis task.

For example, program code used by the target engine to filter the target traffic is: {var webtodb traffic=select tcp: 3399 from 1.1.1.1/24 to 2.2.2.2}, this means, the program code means that the reference source address is 1.1.1.1/24, and the reference destination address is 2.2.2.2.

Then, the target engine sequentially analyzes, using the plurality of operators based on the operator orchestration result, the traffic used to execute the target traffic analysis task, to obtain the traffic analysis result. In the operator orchestration result, an input of a first operator is the traffic used to execute the target traffic analysis task, and inputs of remaining operators are all outputs of previous operators. In other words, the remaining operators further analyze the outputs of the previous operators. In this way, analysis results output by other operators are combined in an output of a last operator in the operator orchestration result, to obtain the traffic analysis result.

Optionally, the program code includes a result filter condition. In this way, after the target engine determines the traffic analysis result based on the program code, the target engine can further filter the traffic analysis result based on the result filter condition included in the program code, and send a filtered traffic analysis result to the management node. After receiving the filtered traffic analysis result sent by the target engine, the management node sends the filtered traffic analysis result to the user terminal. The user terminal receives and displays the filtered traffic analysis result sent by the management node.

The user terminal displays the filtered traffic analysis result in a file form, or displays the filtered traffic analysis result in an icon form. Certainly, during actual application, the user terminal can alternatively display the filtered traffic analysis result in another manner. This is not limited in this embodiment of this application.

Figure 3:
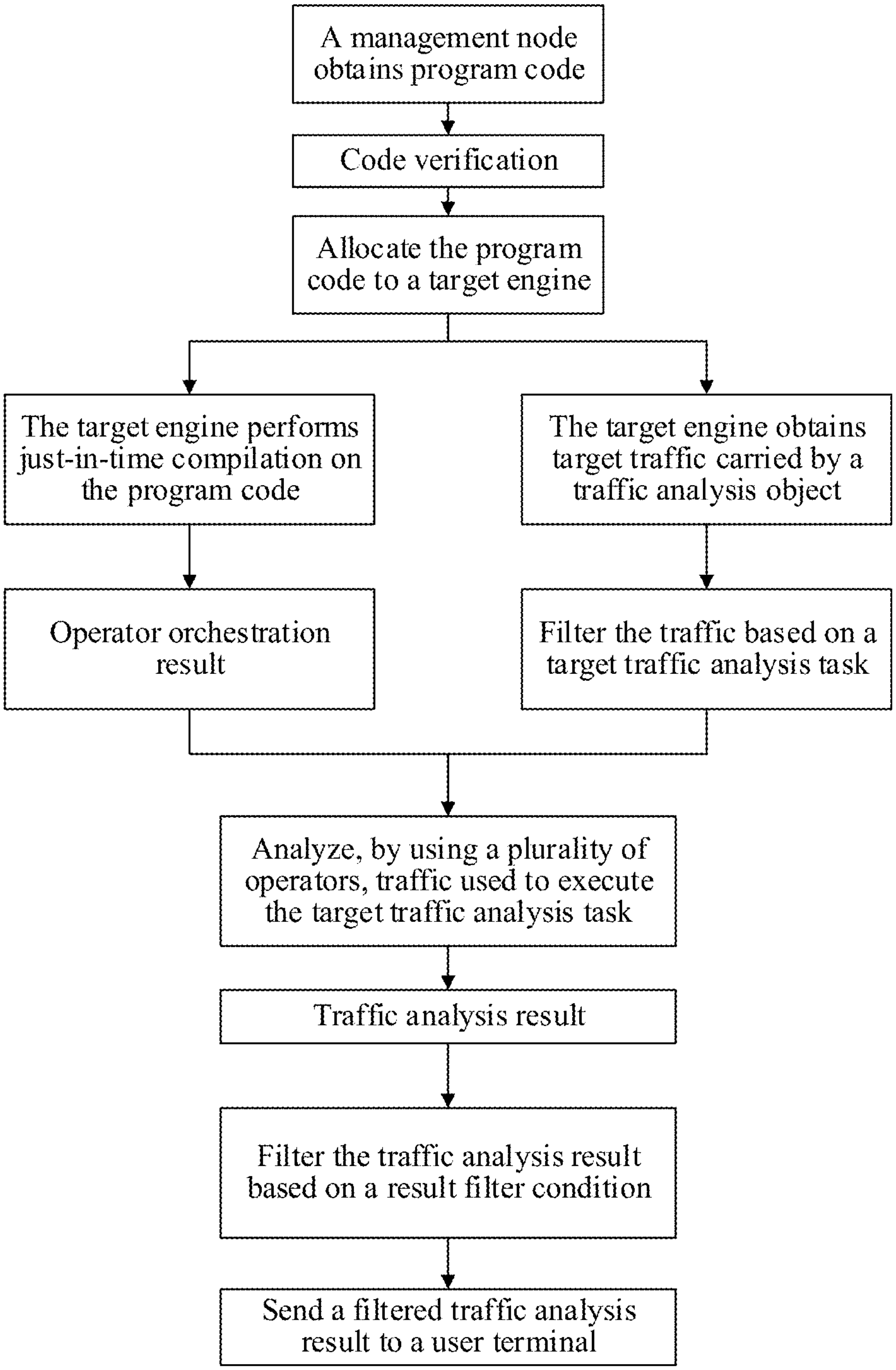
FIG. 3 is a diagram of a traffic analysis procedure according to an embodiment of this application.

For example, FIG. 3 is a diagram of a traffic analysis procedure according to an embodiment of this application. In FIG. 3, a management node obtains program code, and verifies the program code. When the verification of the program code succeeds, the program code is allocated to a target engine based on a location of a traffic analysis object. After receiving the program code, the target engine performs just-in-time compilation on the program code based on a language format that can be run by the target engine, to obtain an operator orchestration result. Then, the target engine obtains target traffic carried by the traffic analysis object, filters the target traffic based on a target traffic analysis task to obtain traffic used to execute the target traffic analysis task, and then analyzes, using a plurality of operators, the traffic used to execute the target traffic analysis task, to obtain a traffic analysis result. Finally, the target engine filters the traffic analysis result based on a result filter condition included in the program code, and sends a filtered traffic analysis result to the management node. After receiving the filtered traffic analysis result sent by the target engine, the management node sends the filtered traffic analysis result to a user terminal.

It should be noted that, that the target engine filters the traffic analysis result based on the result filter condition, and sends the filtered traffic analysis result to the management node, such that the user terminal receives the traffic analysis result corresponding to the user terminal sent by the management node is merely an example. In some other embodiments, a plurality of traffic analysis engines is deployed at any location in a tree structure in an entire cloud computing environment. Each of the plurality of traffic analysis engines performs traffic analysis according to the foregoing steps, to obtain a traffic analysis result, and then sends the corresponding traffic analysis result to the management node. After receiving traffic analysis results sent by the traffic analysis engines, the management node manages the traffic analysis results corresponding to the traffic analysis engines in a unified manner. Then, the user terminal obtains, based on traffic analysis result obtaining permission corresponding to the user terminal, the traffic analysis result corresponding to the user terminal from the traffic analysis results managed by the management node in the unified manner. In other words, the user terminal can passively receive the traffic analysis result corresponding to the user terminal, and can also actively obtain, based on the traffic analysis result obtaining permission, the traffic analysis result corresponding to the user terminal from the management node.

For example, the management node aggregates traffic analysis results corresponding to traffic analysis engines in a same domain. Certainly, during actual application, the management node can alternatively manage, in another manner, the traffic analysis results corresponding to the traffic analysis engines in the unified manner. This is not limited in this embodiment of this application.

The traffic analysis result obtaining permission corresponding to the user terminal is determined by the management node based on the obtained program code. For example, the management node determines the traffic analysis object included in the program code as an obtaining object corresponding to the user terminal. In this way, the user terminal can obtain, based on the obtaining object indicated by the obtaining permission, the traffic analysis result corresponding to the obtaining object only from the traffic analysis results managed by the management node in the unified manner.

Figure 4:
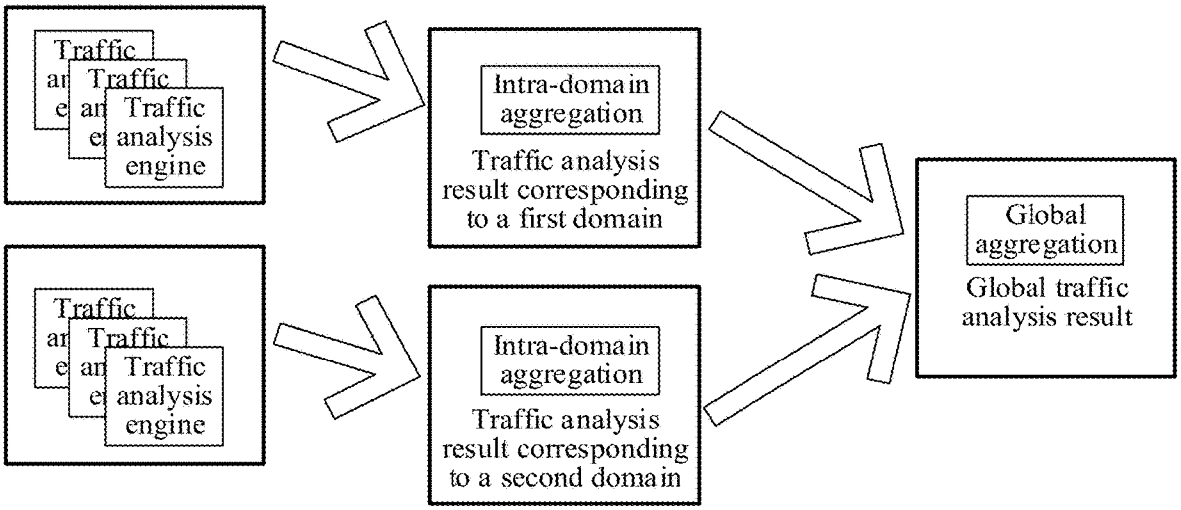
FIG. 4 is a diagram of managing, by a management node, traffic analysis results corresponding to traffic analysis engines in a unified manner according to an embodiment of this application.

For example, FIG. 4 is a diagram of managing, by a management node, traffic analysis results corresponding to traffic analysis engines in a unified manner according to an embodiment of this application. In FIG. 4, a cloud platform includes six traffic analysis engines. The management node divides the six traffic analysis engines into two domains: a first domain and a second domain. The first domain and the second domain each include three traffic analysis engines. The management node first performs intra-domain aggregation on traffic analysis results corresponding to traffic analysis engines located in a same domain, to obtain a traffic analysis result corresponding to the first domain and a traffic analysis result corresponding to the second domain. Then, the management node performs global aggregation on the traffic analysis result corresponding to the first domain and the traffic analysis result corresponding to the second domain, to obtain a global traffic analysis result corresponding to the entire cloud platform.

Optionally, the program code further includes traffic analysis start time and traffic analysis duration. The traffic analysis start time is time at which the target engine starts to run executable code corresponding to the program code. The traffic analysis duration is duration from obtaining the program code by the management node to outputting the traffic analysis result by the target engine. In other words, when submitting the program code to the management node, the user terminal adds the traffic analysis start time and the traffic analysis duration to the program code. In this way, after receiving the program code submitted by the user terminal, the management node first locally stores the program code, and then allocates the program code to the target engine when the traffic analysis start time arrives, such that the target engine can perform traffic analysis periodically, and output the traffic analysis result when the traffic analysis duration expires.

It should be noted that, that the program code includes the location of the traffic analysis object, a plurality of operators used to execute the target traffic analysis task, the result filter condition, and the traffic analysis start time mentioned above is merely an example. During actual application, the program code can further include other information, for example, time consumed by the target engine to execute the target traffic analysis task and execution precision; for another example, a priority of executing each target traffic analysis task by a target engine when a plurality of target traffic analysis tasks is allocated to the same target engine.

In this embodiment of this application, the cloud platform includes the management node and the traffic analysis engines. The management node is configured to obtain the program code corresponding to the target traffic analysis task, and the traffic analysis engine is configured to perform traffic analysis based on the program code. In other words, in this embodiment of this application, after the management node in the cloud platform obtains the program code corresponding to the target traffic analysis task, the traffic analysis engine may directly analyze traffic in the cloud platform, and there is no need to first copy to-be-analyzed traffic based on a packet capture condition, and then send mirrored traffic to a traffic analysis device deployed outside the cloud platform for traffic analysis. Therefore, timeliness of traffic analysis can be improved.

In addition, after obtaining the program code, the management node first verifies the program code, and when the verification of the program code succeeds, the traffic analysis engine performs traffic analysis, such that accuracy of the traffic analysis can be further improved. In addition, all program code corresponding to the target traffic analysis task obtained by the management node is in a DSL language format. Therefore, an entire cloud computing environment is used as a unified language interface, such that different traffic analysis engines correspond to the unified language format. In other words, according to the method provided in this embodiment of this application, real-time and accurate traffic analysis can be performed in the cloud computing environment using the unified DSL language format.

Figure 5:
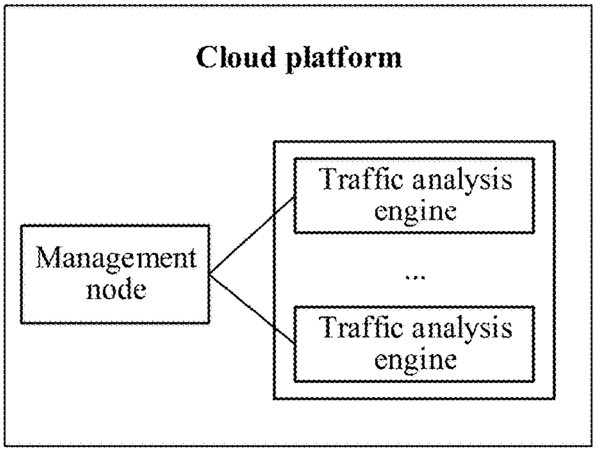
FIG. 5 is a diagram of an architecture of a cloud platform according to an embodiment of this application.

FIG. 5 is a diagram of an architecture of a cloud platform according to an embodiment of this application. The cloud platform includes a management node and a plurality of traffic analysis engines. A communication connection is established between the management node and the plurality of traffic analysis engines.

The management node is configured to: obtain, according to the traffic analysis method provided in embodiments of this application, program code of a domain-specific language DSL corresponding to a target traffic analysis task, where the program code includes a location of a traffic analysis object, and the traffic analysis object is used to carry to-be-analyzed target traffic; and verify the program code. When the verification of the program code succeeds, the management node allocates the program code to a target engine, where the target engine is a traffic analysis engine closest to the traffic analysis object in the plurality of traffic analysis engines.

The target engine in the plurality of traffic analysis engines is configured to determine a traffic analysis result based on the program code.

Both the management node and the traffic analysis engine in FIG. 5 may be implemented by software, or may be implemented by hardware. For example, the following describes an implementation of the management node. Similarly, for an implementation of the traffic analysis engine, refer to the implementation of the management node.

The management node may include code (an application program) run on a computing instance. The computing instance may be at least one of computing devices such as a physical host, a virtual machine, and a container. Further, there may be one or more computing devices. For example, the management node may include code run on a plurality of hosts/virtual machines/containers. It should be noted that the plurality of hosts/virtual machines/containers used to run the code may be distributed in a same region, or may be distributed in different regions. The plurality of hosts/virtual machines/containers used to run the code may be distributed in a same available zone (AZ), or may be distributed in different available zones (AZs). Each AZ includes one data center or a plurality of data centers that are geographically close to each other. Generally, one region may include a plurality of AZs.

Similarly, the plurality of hosts/virtual machines/containers used to run the code may be distributed in a same virtual private cloud (VPC), or may be distributed in a plurality of VPCs. Generally, one VPC is set in one region. A communication gateway may need to be set in each VPC for communication between two VPCs in a same region and cross-region communication between VPCs in different regions. Interconnection between VPCs is implemented through the communication gateway.

The management node may include at least one computing device, for example, a server. Alternatively, the management node may be a device implemented using an ASIC, a programmable logic device (PLD), or the like. The PLD may be a complex programmable logic device (CPLD), a field-programmable logic gate array (FPGA), generic array logic (GAL), or any combination thereof.

The plurality of computing devices included in the management node may be distributed in a same region, or may be distributed in different regions. The plurality of computing devices included in the management node may be distributed in a same AZ, or may be distributed in different AZs. Similarly, the plurality of computing devices included in the management node may be distributed in a same VPC, or may be distributed in a plurality of VPCs. The plurality of computing devices may be any combination of computing devices such as the server, the ASIC, the PLD, the CPLD, the FPGA, and the GAL.

Figure 6:
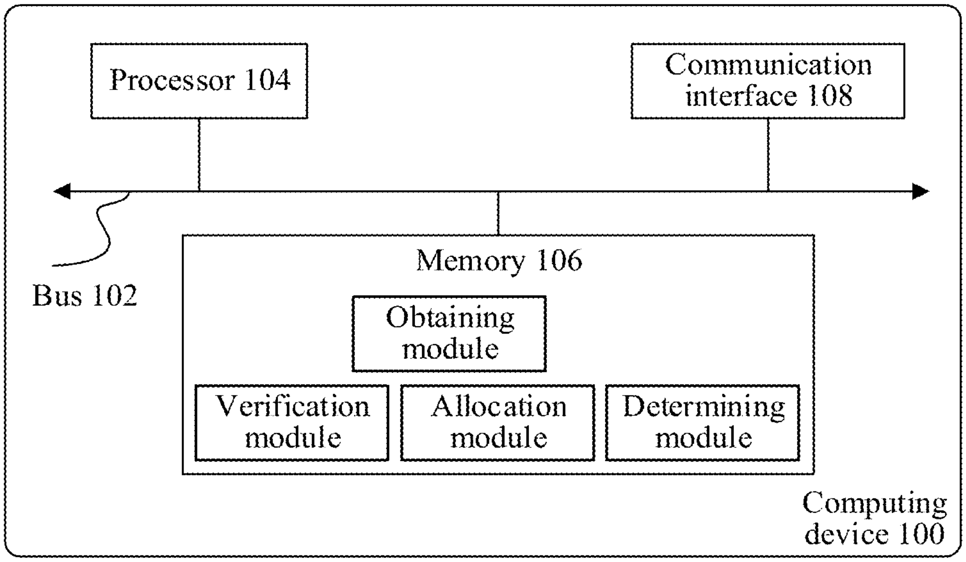
FIG. 6 is a diagram of a structure of a computing device according to an embodiment of this application.

An embodiment of this application further provides a computing device 100. The computing device 100 may become a part or all of a management node, or may become a part or all of a traffic analysis engine. As shown in FIG. 6, the computing device 100 includes a bus 102, a processor 104, a memory 106, and a communication interface 108. The processor 104, the memory 106, and the communication interface 108 communicate with each other through the bus 102. The computing device 100 may be a server or a terminal device. It should be understood that quantities of processors and memories in the computing device 100 are not limited in this application.

The bus 102 may be a peripheral component interconnect (PCI) bus, an Extended Industry Standard Architecture (EISA) bus, or the like. The bus 102 may be classified into an address bus, a data bus, a control bus, and the like. For ease of representation, only one line is used for representation in FIG. 6, but this does not mean that there is only one bus or only one type of bus. The bus 102 may include a path for transmitting information between components (for example, the memory 106, the processor 104, and the communication interface 108) of the computing device 100.

The processor 104 may include any one or more of processors such as a central processing unit (CPU), a graphics processing unit (GPU), a microprocessor (MP), a digital signal processor (DSP), and an integrated circuit. The integrated circuit is, for example, an ASIC, a PLD, or a combination thereof. Optionally, the PLD is a CPLD, an FPGA, GAL, or any combination thereof.

The memory 106 may include a volatile memory, for example, a random-access memory (RAM). The memory 106 may further include a non-volatile memory, for example, a read-only memory (ROM), a flash memory, a hard disk drive (HDD), or a solid-state drive (SSD), or any other medium that can be used to carry or store expected program code in a form of an instruction or a data structure and that can be accessed by a computer, but is not limited thereto. The memory 106 exists independently, and is connected to the processor 104 through the bus 102, or the memory 106 is integrated with the processor 104.

The memory 106 stores executable program code, and the processor 104 executes the executable program code to implement functions of the management node and the traffic analysis engine, to implement the traffic analysis method provided in embodiments of this application. In other words, the memory 106 stores instructions used to perform the traffic analysis method.

Figure 9:
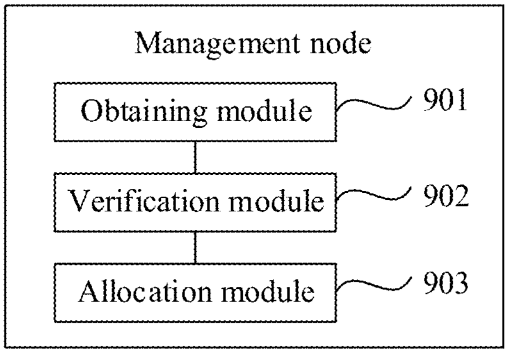
FIG. 9 is a diagram of a structure of a management node according to an embodiment of this application.
Figure 10:
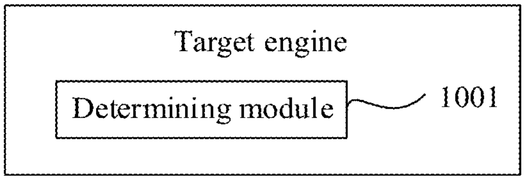
FIG. 10 is a diagram of a structure of a target engine according to an embodiment of this application.

For example, the memory 106 stores the executable program code, and the processor 104 executes the executable program code to separately implement functions of the obtaining module, the verification module, and the allocation module in the management node shown in FIG. 9, or implement functions of the determining module in the target engine shown in FIG. 10. In this way, the traffic analysis method provided in embodiments of this application is implemented.

The communication interface 108 implements communication between the computing device 100 and another device or a communication network using a transceiver module, for example, but not limited to a network interface card or a transceiver. The network interface includes a wired communication interface, or further includes a wireless communication interface. The wired communication interface is, for example, an Ethernet interface. The Ethernet interface is an optical interface, an electrical interface, or a combination thereof. The wireless communication interface is a wireless local area network (WLAN) interface, a cellular network communication interface, a combination thereof, or the like.

An embodiment of this application further provides a computing device cluster. The computing device cluster includes a plurality of computing devices. The computing device may be a server, for example, a central server, an edge server, or a local server in a local data center. In some embodiments, the computing device may alternatively be a terminal device, for example, a desktop computer, a notebook computer, or a smartphone.

Figure 7:
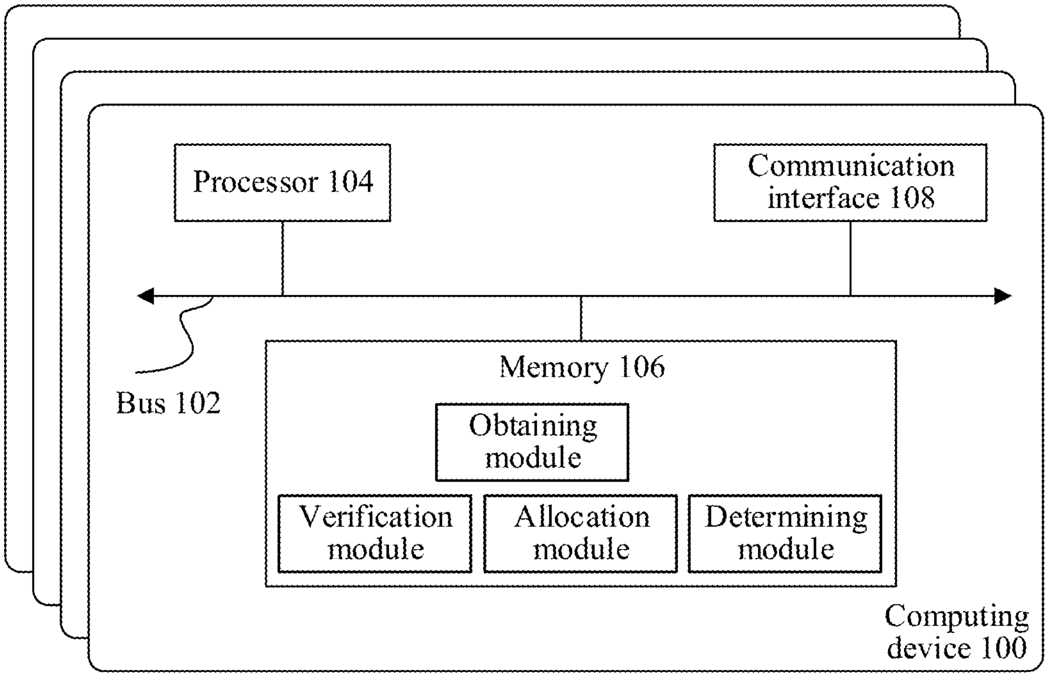
FIG. 7 is a diagram of an architecture of a computing device cluster according to an embodiment of this application.

As shown in FIG. 7, the computing device cluster includes the plurality of computing devices 100. Memories 106 in the plurality of computing devices 100 in the computing device cluster may store same instructions used to perform the foregoing traffic analysis method.

In some possible implementations, memories 106 in the plurality of computing devices 100 in the computing device cluster each may alternatively store a part of instructions used to perform the foregoing traffic analysis method. In other words, a combination of the plurality of computing devices 100 may jointly execute all instructions used to perform the foregoing traffic analysis method. For example, the plurality of computing devices 100 includes management nodes and a plurality of traffic analysis engines. A management node and a memory 106 of each traffic analysis engine each store a part of instructions used for the foregoing traffic analysis method. A combination of the management nodes and the plurality of traffic analysis engines can jointly execute all instructions for the foregoing traffic analysis method.

It should be noted that, the memories 106 in different computing devices 100 in the computing device cluster may store different instructions, which are respectively used to perform a part of functions of a management node or a target engine. In other words, the instructions stored in the memories 106 in different computing devices 100 may implement a function of a part or all of modules included in the management node or the target engine.

Figure 8:
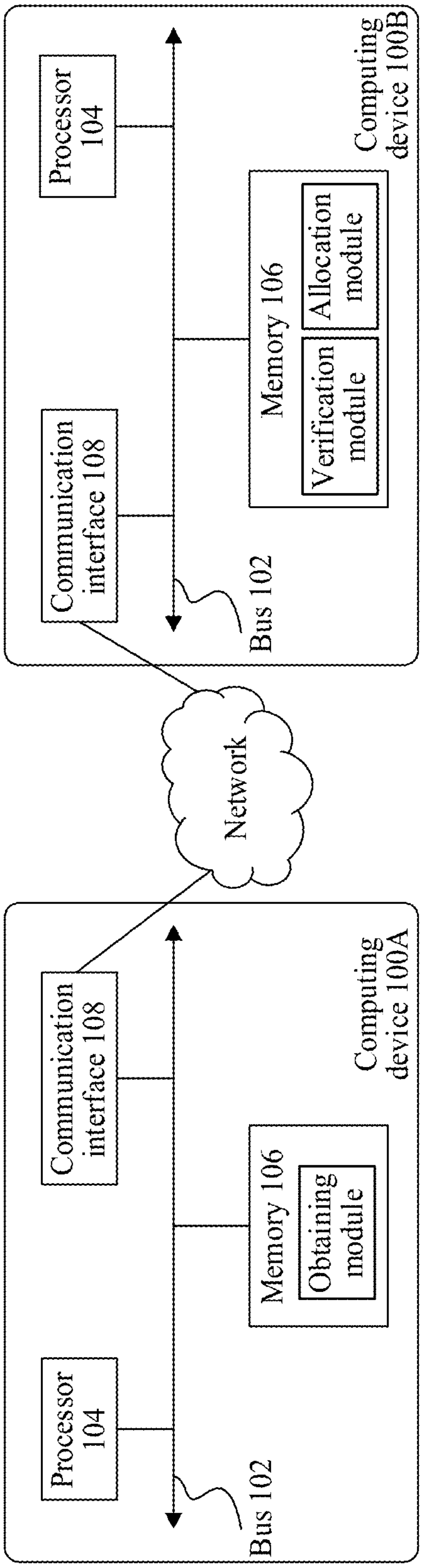
FIG. 8 is a diagram of a connection between computing devices according to an embodiment of this application.

In some possible implementations, the one or more computing devices in the computing device cluster may be connected through a network. The network may be a wide area network, a local area network, or the like. FIG. 8 shows a possible implementation. As shown in FIG. 8, two computing devices 100A and 100B are connected through a network. Each computing device is connected to the network through a communication interface of the computing device. In this type of possible implementation, a memory 106 in the computing device 100A stores instructions for performing a function of a part of modules included in a management node or a target engine. In addition, a memory 106 in the computing device 100B stores instructions for performing a function of another part of modules included in the management node or the target engine.

For example, the memory 106 in the computing device 100A stores instructions for performing a function of an obtaining module included in the management node. In addition, the memory 106 in the computing device 100B stores instructions for performing functions of a verification module and an allocation module that are included in the management node.

It should be understood that a function of the computing device 100A shown in FIG. 8 may alternatively be completed by a plurality of computing devices 100. Similarly, a function of the computing device 100B may alternatively be completed by a plurality of computing devices 100.

FIG. 9 is a diagram of a structure of a management node according to an embodiment of this application. The management node is a management node included in a cloud platform, and the cloud platform further includes a plurality of traffic analysis engines. Refer to FIG. 9. The management node includes an obtaining module 901, a verification module 902, and an allocation module 903.

The obtaining module 901 is configured to obtain program code of a domain-specific language DSL corresponding to a target traffic analysis task, where the program code includes a location of a traffic analysis object, and the traffic analysis object is used to carry to-be-analyzed target traffic.

The verification module 902 is configured to verify the program code.

The allocation module 903 is configured to: when the verification of the program code succeeds, allocate the program code to a target engine, where the target engine is a traffic analysis engine closest to the traffic analysis object in the plurality of traffic analysis engines.

Optionally, the verification module 902 is configured to: perform syntax analysis on the program code, to obtain a syntax analysis result; when the syntax analysis result indicates that the program code has no syntax error, perform semantic analysis on the program code, to obtain a semantic analysis result; and when the semantic analysis result indicates that the program code has no semantic error, determine that the verification of the program code succeeds.

Optionally, the program code includes a result filter condition.

The management node further includes: a receiving module, configured to receive a filtered traffic analysis result sent by the target engine, where the filtered traffic analysis result is obtained by the target engine by filtering a traffic analysis result based on the result filter condition; and a sending module, configured to send the filtered traffic analysis result to a user terminal.

Optionally, the obtaining module 901 is configured to: receive a program purchase request submitted by the user terminal, where the program purchase request carries an identifier of the target traffic analysis task; and obtain, based on the identifier of the target traffic analysis task, the program code of the DSL corresponding to the target traffic analysis task from stored program code of DSLs corresponding to a plurality of traffic analysis tasks.

It should be noted that, when the management node provided in the foregoing embodiment performs traffic analysis, division into the foregoing functional modules is merely used as an example for description. During actual application, the foregoing functions may be allocated to different functional modules for implementation based on a requirement. An internal structure of the apparatus is divided into different functional modules, to implement all or a part of the functions described above. In addition, the management node provided in the foregoing embodiment belongs to a same concept as the traffic analysis method embodiment. For a implementation process, refer to the method embodiment. Details are not described herein again.

FIG. 10 is a diagram of a structure of a target engine according to an embodiment of this application. The target engine is a traffic analysis engine closest to a traffic analysis object in a plurality of traffic analysis engines included in a cloud platform, and the cloud platform further includes a management node. Refer to FIG. 10. The target engine includes a determining module 1001.

The determining module 1001 is configured to determine a traffic analysis result based on program code, where the program code is program code of a DSL allocated by the management node to the target engine, the program code includes a location of the traffic analysis object, and the traffic analysis object is used to carry to-be-analyzed target traffic.

Optionally, the determining module 1001 includes: a compilation unit, configured to perform just-in-time compilation on the program code, to obtain executable code corresponding to the program code; and a running unit, configured to run the executable code, to obtain the traffic analysis result.

Optionally, the compilation unit is configured to: determine, based on the program code, a plurality of operators used to execute a target traffic analysis task; orchestrate a sequence of the plurality of operators, to obtain an operator orchestration result; and determine the operator orchestration result as the executable code corresponding to the program code.

Optionally, the running unit is configured to: perform traffic analysis on the target traffic by running the plurality of operators based on the operator orchestration result, to obtain the traffic analysis result.

Optionally, the program code includes a result filter condition.

The target engine further includes: a filtering module, configured to filter the traffic analysis result based on the result filter condition; and a sending module, configured to send a filtered traffic analysis result to the management node.

It should be noted that, when the target engine provided in the foregoing embodiment performs traffic analysis, division into the foregoing functional modules is merely used as an example for description. During actual application, the foregoing functions may be allocated to different functional modules for implementation based on a requirement. An internal structure of the apparatus is divided into different functional modules, to implement all or a part of the functions described above. In addition, the target engine provided in the foregoing embodiment belongs to a same concept as the traffic analysis method embodiment. For a implementation process, refer to the method embodiment. Details are not described herein again.

The obtaining module, the verification module, and the allocation module in the management node shown in FIG. 9, and the determining module in the target engine shown in FIG. 10 each may be implemented by software, hardware, or a combination of software and hardware. The following uses the obtaining module as an example to describe an implementation of the obtaining module. Similarly, for an implementation of the foregoing another module, refer to the implementation of the obtaining module.

The module is used as an example of a software functional unit, and the obtaining module may include code run on a computing instance. The computing instance may include at least one of a physical host, a virtual machine, and a container. Further, there may be one or more computing instances. For example, the obtaining module may include code run on a plurality of hosts/virtual machines/containers. It should be noted that the plurality of hosts/virtual machines/containers used to run the code may be distributed in a same region, or may be distributed in different regions. Further, the plurality of hosts/virtual machines/containers used to run the code may be distributed in a same AZ, or may be distributed in different AZs. Each AZ includes one data center or a plurality of data centers that are geographically close to each other. Generally, one region may include a plurality of AZs.

Similarly, the plurality of hosts/virtual machines/containers used to run the code may be distributed in a same VPC, or may be distributed in a plurality of VPCs. Generally, one VPC is set in one region. A communication gateway may need to be set in each VPC for communication between two VPCs in a same region or between VPCs in different regions. Interconnection between VPCs is implemented through the communication gateway.

The module is used as an example of a hardware function unit, and the obtaining module may include at least one computing device, for example, a server. Alternatively, the obtaining module may be a device implemented using an ASIC or a PLD, or the like. The PLD may be implemented using a CPLD, an FPGA, GAL, or any combination thereof.

The plurality of computing devices included in the obtaining module may be distributed in a same region, or may be distributed in different regions. The plurality of computing devices included in the obtaining module may be distributed in a same AZ, or may be distributed in different AZs. Similarly, the plurality of computing devices included in the obtaining module may be distributed in a same VPC, or may be distributed in a plurality of VPCs. The plurality of computing devices may be any combination of computing devices such as a server, an ASIC, a PLD, a CPLD, an FPGA, and GAL.

In another embodiment, the obtaining module in the management node may be configured to perform any step in the foregoing traffic analysis method, the verification module in the management node may be configured to perform any step in the foregoing traffic analysis method, and the allocation module in the management node may be configured to perform any step in the foregoing traffic analysis method, steps that the obtaining module, the verification module, and the allocation module in the management node are responsible for implementing may be specified as required. The obtaining module, the verification module, and the allocation module in the management node respectively implement different steps in the foregoing traffic analysis method, such that all functions of the management node are implemented.

An embodiment of this application further provides a computer-readable storage medium. The computer-readable storage medium may be any usable medium that can be stored by a computing device, or a data storage device, such as a data center, including one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like. The computer-readable storage medium includes instructions, and the instructions instruct a computing device in a computing device cluster to perform the traffic analysis method provided in embodiments of this application.

An embodiment of this application further provides a computer program product including instructions. The computer program product may be software or a program product that includes instructions and that can run on a computing device or be stored in any usable medium. When the computer program product runs on a computing device included in a computing device cluster, the computing device cluster is enabled to perform the traffic analysis method provided in embodiments of this application.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server or a data center to another website, computer, server or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like. It should be noted that the computer-readable storage medium mentioned in embodiments of this application may be a non-volatile storage medium, in other words, may be a non-transitory storage medium.

It should be understood that "at least one" mentioned in this specification indicates one or more, and "a plurality of" indicates two or more. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that information (including but not limited to user equipment information, user personal information, and the like), data (including but not limited to data used for analysis, stored data, displayed data, and the like), and signals in embodiments of this application are all authorized by a user or fully authorized by all parties, and collection, use, and processing of related data may need to conform to related laws, regulations, and standards of related countries and regions. For example, the program code in embodiments of this application is obtained under full authorization.

The foregoing descriptions are merely example embodiments of this application, but are not intended to limit this application. Any modification, equivalent replacement, or improvement made without departing from the spirit and principle of this application should fall within the protection scope of this application.

The invention claimed is:

1. A traffic analysis method comprising:

obtaining, by a management node of a cloud platform, program code of a domain-specific language (DSL) corresponding to a target traffic analysis task, wherein the program code comprises a location of a traffic analysis object, and wherein the traffic analysis object carries to-be-analyzed target traffic;

performing, by the management node, verification of the program code;

determining, by the management node, the verification succeeds;

allocating, by the management node when the verification succeeds, the program code to a target engine, wherein the target engine is a traffic analysis engine closest to the traffic analysis object from among a plurality of traffic analysis engines of the cloud platform; and determining, by the target engine, a traffic analysis result based on the program code.

2. The traffic analysis method according to claim 1, wherein performing the verification of the program code comprises:

performing syntax analysis on the program code in order to obtain a syntax analysis result;

determining the syntax analysis result indicates that the program code has no syntax error;

performing semantic analysis on the program code in order to obtain a semantic analysis result; and determining the semantic analysis result indicates that the program code has no semantic error.

3. The traffic analysis method according to claim 1, wherein determining the traffic analysis result based on the program code comprises:

performing just-in-time compilation on the program code in order to obtain executable code corresponding to the program code; and running the executable code in order to obtain the traffic analysis result.

4. The traffic analysis method according to claim 3, wherein performing the just-in-time compilation on the program code in order to obtain the executable code corresponding to the program code comprises:

determining, based on the program code, a plurality of operators used to execute the target traffic analysis task;

orchestrating a sequence of the plurality of operators in order to obtain an operator orchestration result; and determining the operator orchestration result as the executable code corresponding to the program code.

5. The traffic analysis method according to claim 4, wherein running the executable code in order to obtain the traffic analysis result comprises performing traffic analysis on the to-be-analyzed target traffic by running the plurality of operators based on the operator orchestration result in order to obtain the traffic analysis result.

6. The traffic analysis method according to claim 1, wherein the program code comprises a result filter condition, and wherein after determining the traffic analysis result based on the program code, the traffic analysis method further comprises:

filtering, by the target engine, the traffic analysis result based on the result filter condition to generate a filtered traffic analysis result;

sending, by the target engine, the filtered traffic analysis result to the management node; and sending, by the management node, the filtered traffic analysis result to a user terminal.

7. The traffic analysis method according to claim 1, wherein obtaining the program code of the DSL corresponding to the target traffic analysis task comprises:

receiving a program purchase request from a user terminal, wherein the program purchase request carries an identifier of the target traffic analysis task; and obtaining, based on the identifier, the program code of the DSL corresponding to the target traffic analysis task from stored program code of DSLs corresponding to a plurality of traffic analysis tasks.

8. A computing device cluster comprising:

at least one computing device comprising:

a memory configured to store executable instructions; and one or more processors coupled to the memory and configured to execute instructions to cause the computing device cluster to:

obtain, by a management node of a cloud platform, program code of a domain-specific language (DSL) corresponding to a target traffic analysis task, wherein the program code comprises a location of a traffic analysis object, and wherein the traffic analysis object carries to-be-analyzed target traffic;

perform, by the management node, verification of the program code;

determine, by the management node, the verification succeeds;

allocate, by the management node when the verification succeeds, the program code to a target engine, wherein the target engine is a traffic analysis engine closest to the traffic analysis object from among a plurality of traffic analysis engines of the cloud platform; and determine, by the target engine, a traffic analysis result based on the program code.

9. The computing device cluster according to claim 8, wherein the one or more processors are further configured to execute the instructions to cause the computing device cluster to perform the verification of the program code by:

performing syntax analysis on the program code in order to obtain a syntax analysis result;

determining the syntax analysis result indicates that the program code has no syntax error;

performing semantic analysis on the program code in order to obtain a semantic analysis result; and determining the semantic analysis result indicates that the program code has no semantic error.

10. The computing device cluster according to claim 8, wherein the one or more processors are further configured to execute the instructions to cause the computing device cluster to determine the traffic analysis result based on the program code by:

performing just-in-time compilation on the program code in order to obtain executable code corresponding to the program code; and running the executable code in order to obtain the traffic analysis result.

11. The computing device cluster according to claim 10, wherein the one or more processors are further configured to execute the instructions to cause the computing device cluster to perform the just-in-time compilation on the program code in order to obtain the executable code corresponding to the program code by:

determining, based on the program code, a plurality of operators used to execute the target traffic analysis task;

orchestrating a sequence of the plurality of operators in order to obtain an operator orchestration result; and determining the operator orchestration result as the executable code corresponding to the program code.

12. The computing device cluster according to claim 11, wherein the one or more processors are further configured to execute the instructions to cause the computing device cluster to run the executable code in order to obtain the traffic analysis result by performing traffic analysis on the to-be-analyzed target traffic by running the plurality of operators based on the operator orchestration result in order to obtain the traffic analysis result.

13. The computing device cluster according to claim 8, wherein the program code comprises a result filter condition, and wherein after determining the traffic analysis result based on the program code, the one or more processors are further configured to execute the instructions to cause the computing device cluster to:

filter, by the target engine, the traffic analysis result based on the result filter condition to generate a filtered traffic analysis result;

send, by the target engine, the filtered traffic analysis result to the management node; and send, by the management node, the filtered traffic analysis result to a user terminal.

14. The computing device cluster according to claim 8, wherein the one or more processors are further configured to execute the instructions to cause the computing device cluster to obtain the program code of the DSL corresponding to the target traffic analysis task by:

receiving a program purchase request from a user terminal, wherein the program purchase request carries an identifier of the target traffic analysis task; and obtaining, based on the identifier, the program code of the DSL corresponding to the target traffic analysis task from stored program code of DSLs corresponding to a plurality of traffic analysis tasks.

15. A computer program product comprising instructions that are stored on a non-transitory computer-readable medium and that, when executed by one or more processors, cause at least one computing device of a computing device cluster to:

obtain, by a management node of a cloud platform, program code of a domain-specific language (DSL) corresponding to a target traffic analysis task, wherein the program code comprises a location of a traffic analysis object, and wherein the traffic analysis object carries to-be-analyzed target traffic;

perform, by the management node, verification of the program code;

determine, by the management node, the verification succeeds;

allocate, by the management node when the verification succeeds, the program code to a target engine, wherein the target engine is a traffic analysis engine closest to the traffic analysis object from among a plurality of traffic analysis engines of the cloud platform; and determine, by the target engine, a traffic analysis result based on the program code.

16. The computer program product according to claim 15, wherein the instructions, when executed by the one or more processors, further cause the at least one computing device to perform the verification of the program code by:

performing syntax analysis on the program code in order to obtain a syntax analysis result;

determining the syntax analysis result indicates that the program code has no syntax error;

performing semantic analysis on the program code in order to obtain a semantic analysis result; and determining the semantic analysis result indicates that the program code has no semantic error.

17. The computer program product according to claim 15, wherein the instructions, when executed by the one or more processors, further cause the at least one computing device to determine the traffic analysis result based on the program code by:

performing just-in-time compilation on the program code in order to obtain executable code corresponding to the program code; and running the executable code in order to obtain the traffic analysis result.

18. The computer program product according to claim 17, wherein the instructions, when executed by the one or more processors, further cause the at least one computing device to perform the just-in-time compilation on the program code in order to obtain the executable code corresponding to the program code by:

determining, based on the program code, a plurality of operators used to execute the target traffic analysis task;

orchestrating a sequence of the plurality of operators in order to obtain an operator orchestration result; and determining the operator orchestration result as the executable code corresponding to the program code.

19. The computer program product according to claim 18, wherein the instructions, when executed by the one or more processors, further cause the at least one computing device to run the executable code in order to obtain the traffic analysis result by performing traffic analysis on the to-be-analyzed target traffic by running the plurality of operators based on the operator orchestration result in order to obtain the traffic analysis result.

20. The computer program product according to claim 15, wherein the program code comprises a result filter condition, and wherein after determining the traffic analysis result based on the program code, the instructions, when executed by the one or more processors, further cause the at least one computing device to:

filter, by the target engine, the traffic analysis result based on the result filter condition to generate a filtered traffic analysis result;

send, by the target engine, the filtered traffic analysis result to the management node; and send, by the management node, the filtered traffic analysis result to a user terminal.

* * * * *